United States Patent
Valdivia Guerrero et al.

(10) Patent No.: US 11,613,444 B2
(45) Date of Patent: Mar. 28, 2023

(54) DECENTRALIZED POWER MANAGEMENT IN AN ELEVATOR SYSTEM

(71) Applicant: Otis Elevator Company, Farmington, CT (US)

(72) Inventors: Virgilio Valdivia Guerrero, Roquetas de Mar (ES); Ismail Agirman, Southington, CT (US); Daniel Diaz-Lopez, Tres Cantos (IE); Mario Sanz Abia, Valladolid (ES); Herbert Horbrugger, Berlin (DE); Stephan Glessner, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 654 days.

(21) Appl. No.: 16/654,251

(22) Filed: Oct. 16, 2019

(65) Prior Publication Data

US 2020/0122962 A1    Apr. 23, 2020

(30) Foreign Application Priority Data

Oct. 19, 2018  (EP) ..................... 18201456

(51) Int. Cl.
*H02P 3/22* (2006.01)
*H02P 27/08* (2006.01)
*B66B 1/30* (2006.01)

(52) U.S. Cl.
CPC ............... *B66B 1/308* (2013.01); *H02P 3/22* (2013.01); *H02P 27/085* (2013.01); *H02P 2201/03* (2013.01)

(58) Field of Classification Search
USPC ...................................................... 187/289
See application file for complete search history.

(56) References Cited

U.S. PATENT DOCUMENTS

| 6,415,892 | B2 | 7/2002 | Araki et al. |
| 6,431,324 | B2 | 8/2002 | Tajima et al. |

(Continued)

FOREIGN PATENT DOCUMENTS

| CN | 102225730 A | 10/2011 |
| CN | 103842278 A | 6/2014 |

(Continued)

OTHER PUBLICATIONS

European Search Report for application EP 18201456.3, dated May 8, 2019, 19 pages.

*Primary Examiner* — Jorge L Carrasquillo
(74) *Attorney, Agent, or Firm* — Cantor Colburn LLP

(57) ABSTRACT

A power management system comprises an AC-power-source controller configured to control power supply between the AC power source and a common DC bus, the AC-power-source controller further configured to limit AC power supplied from the AC power source to the common DC bus to a first AC-power-source power limit; a power inverter configured to invert the DC power on the common DC bus into AC output power for driving the electric motor; a DC power source configured to supply DC power to the common DC bus; and a DC-power-source controller configured to control power supply between the DC power source and the common DC bus, the DC-power-source controller further configured to start supplying DC power from the DC power source to the common DC bus in response to a detection of a voltage drop on the common DC bus from a AC-power-source reference voltage to a DC-power-source reference voltage.

13 Claims, 7 Drawing Sheets

(56) References Cited

U.S. PATENT DOCUMENTS

| | | | |
|---|---|---|---|
| 6,435,311 | B2 | 8/2002 | Araki et al. |
| 6,439,348 | B2 | 8/2002 | Tajima et al. |
| 6,460,658 | B2 | 10/2002 | Suga et al. |
| 6,471,013 | B2 | 10/2002 | Banno et al. |
| 6,522,099 | B2 | 2/2003 | Tominaga et al. |
| 7,331,426 | B2 | 2/2008 | Jahkonen |
| 7,554,278 | B2 | 6/2009 | Wegner-Donnelly et al. |
| 9,296,589 | B2 | 3/2016 | Marvin |
| 9,481,549 | B2 | 11/2016 | Ishiguro |
| 2014/0238782 | A1* | 8/2014 | Ishiguro ............... B66B 1/302 187/290 |
| 2017/0137259 | A1* | 5/2017 | Jacobs ................. B66B 1/308 |
| 2018/0229968 | A1* | 8/2018 | Cheng ................. B66B 1/3446 |
| 2021/0281080 | A1* | 9/2021 | Danielsen ............ F03D 80/00 |

FOREIGN PATENT DOCUMENTS

| | | | | |
|---|---|---|---|---|
| EP | 1484832 | A2 | 12/2004 | |
| EP | 2336068 | A1 * | 6/2011 | ............. B65B 9/20 |
| EP | 2326586 | B1 | 12/2012 | |
| EP | 2331442 | B1 | 10/2013 | |
| EP | 3153442 | A1 | 4/2017 | |
| JP | H11217166 | A | 8/1999 | |
| JP | 2009120347 | A * | 6/2009 | |
| WO | 2009156953 | A1 | 12/2009 | |
| WO | WO-2009156953 | A1 * | 12/2009 | ............ B66B 1/302 |
| WO | 2010019122 | A1 | 2/2010 | |
| WO | 2011098662 | A4 | 8/2011 | |

\* cited by examiner

DECENTRALIZED POWER MANAGEMENT IN AN ELEVATOR SYSTEM

FOREIGN PRIORITY

This application claims priority to European Patent Application No. 18201456.3, filed Oct. 19, 2018, and all the benefits accruing therefrom under 35 U.S.C. § 119, the contents of which in its entirety are herein incorporated by reference.

BACKGROUND

The invention relates to power management in an elevator system, in particular, to a system and method for decentralizing control of power supply in a power management system for an elevator system.

In an elevator system, an elevator car makes vertical movements to transport passengers between different floors in a building. An electric motor controlled by a power management system is used to drive the elevator car. Stable supply of electric power to the electric motor is important. In order to supply stable electric power to elevator systems, power management systems have been developed to employ various types of power sources.

It would be beneficial to provide an enhanced control strategy for controlling power supply between various types of power sources. In particular it would be beneficial to provide a system and method for controlling power supply between various types of power sources in a decentralized way, i.e. without requiring communications between controllers of the power sources and a central controller.

BRIEF DESCRIPTION

Exemplary embodiments of the invention include a power management system configured to exchange power between an AC power source and an electric motor of an elevator system, the power management system comprising an AC-power-source controller configured to control power supply between the AC power source and a common DC bus, the AC-power-source controller further configured to limit AC power supplied from the AC power source to the common DC bus to a first AC-power-source power limit; a power inverter configured to invert the DC power on the common DC bus into AC power for driving the electric motor; a DC power source configured to supply DC power to the common DC bus; and a DC-power-source controller configured to control power supply between the DC power source and the common DC bus, the DC-power-source controller configured to start supplying DC power from the DC power source to the common DC bus in response to a detection of a voltage drop on the common DC bus from an AC-power-source reference voltage to a DC-power-source reference voltage. Particularly, until the power supplied from the AC power source to the common DC bus reaches the first AC-power-source power limit, the AC-power-source controller may be further configured to keep a voltage level on the common DC bus at the AC-power-source reference voltage. The DC-power-source controller may be further configured to limit power supplied from the DC power source to the common DC bus to a first DC-power-source power limit. A voltage drop or a voltage rise on the common DC bus results from a power limiting action by a power controller included in the power management system.

According to a further embodiment, the power management system may further comprise a third power source configured to supply electric power to the common DC bus, and a third-power-source controller configured to control power supply between the third power source and the common DC bus. The third-power-source controller is further configured to start supplying electric power from the third power source to the common DC bus in response to a detection of a voltage drop on the common DC bus from the DC-power-source reference voltage to a third-power-source reference voltage. Particularly, until the power supplied from the DC power source to the common DC bus reaches the first DC-power-source power limit, the DC-power-source controller may be further configured to keep a voltage level on the common DC bus at the DC-power-source reference voltage. The third power source may be at least one of a supercapacitor or an alternative power source like a fuel cell or a solar panel.

According to a further embodiment, during a regenerative mode, the AC-power-source controller may be further configured to limit AC power supplied from the DC common bus to the AC power source to a second AC-power-source power limit. Also, the DC-power-source controller may be further configured to limit power supplied from the common DC bus to the DC power source to a second DC-power-source power limit. During the regenerative mode, the AC power-source controller may be further configured to supply electric power from the common DC bus to the AC power source in response to a detection of a voltage rise on the DC common bus resulting from a power limiting action by another power controller included in the power management system like the DC-power-source controller, a DBR chopper, and a supercapacitor controller etc. Also, the DC-power-source controller may be configured to supply electric power from the common DC bus to the DC power source in response to a detection of a voltage rise on the DC common bus resulting from a power limiting action by another power controller included in the power management system like the AC-power-source controller, a DBR chopper, and a supercapacitor controller etc. A limiter performing the power limiting action may be embedded in each of the AC power source and the DC power source. When the limiter gets into action, the AC-power-source controller or the DC-power-source controller starts taking control of a power converter or a DC-DC converter.

According to a further embodiment, the power management system may further comprise a dynamic braking resistor (DBR) coupled to the common DC bus and a DBR chopper, which is a controller of the DBR, configured to monitor the common DC bus and to electrically connect or disconnect the DBR and the common DC bus depending on a detected voltage level on the common DC bus. In order to perform this control strategy, a hysteresis control may be used by the DBR chopper. In particular, during a regenerative mode in which the electric motor generates electric power, the DBR chopper may be configured to electrically connect the DBR and the common DC bus in case the voltage on the common DC bus reaches an upper DBR reference voltage. Further, the DBR chopper may be configured to electrically disconnect the DBR from the common DC bus in case the voltage on the common DC bus has dropped from the upper DBR reference voltage to a lower DBR reference voltage due to the power balance inside the system.

Exemplary embodiments of the invention enable each power controller like an AC-power-source controller, a DC-power-source controller, a supercapacitor controller, and a DBR chopper to behave by itself in response to energy flow on a common DC bus, particularly as indicated by a change in voltage level on the common DC bus. Each power controller is configured to limit power supply between a corresponding power source and the common DC bus to predetermined power limits in each direction. Different power limits may be predetermined for different power controllers and the power limitation can be achieved by each power controller by limiting an amount of current flowing from a corresponding power source to each power controller and vice versa. Each power controller is further configured to start supplying electric power between a corresponding power source and the common DC bus in response to a detection of a voltage drop or voltage rise on the common DC bus. Under the situation where electric power supplied by a power source (e.g. an AC power source) is limited to a predetermined power limit, a voltage drop on the common DC bus in case an electric motor of the elevator system is consuming more power than the power limit may be used as the trigger for another power source to start supplying power to the common DC bus (e.g. a DC power source may be triggered to supply electric power to the common DC bus). Thus, upon detecting the voltage drop on the common DC bus, a power controller of said another power source can start supplying the electric power to the common DC bus. In this way, decentralization can be achieved in controlling power supply by each power controller in a power management system for an elevator system. This control scheme does not require fast or normal communications between the controllers or to a central controller via specific communication channels other than communications for exchanging parameters like power limits and reference voltages for power controllers. In contrast, in conventional approaches, it is required to inform individual power controllers how to behave to exchange electric power with the common DC bus and therefore separate communication lines are required to perform communications between the power controllers. With the new approach according to exemplary embodiments of the invention, however, such specific communication lines connecting the power controllers with each other and or with a central controller are not necessary any more. Each of the individual power controllers only monitors the voltage level on the common DC bus, and reacts in response to predefined voltage threshold conditions. The voltage threshold conditions can be defined in such a way that at each time only a predefined of the individual controllers regulates exchange of electric energy on the common DC bus to keep the DC-bus voltage regulated to a pre-defined value, i.e. provides DC-bus voltage control procedures in reaction to changes in demand or supply of electric power.

Exemplary embodiments of the invention include an elevator system equipped with a power management system according to the embodiments of the present invention.

Exemplary embodiments of the invention include a method of controlling power supply in an elevator system having an electric motor which is provided with driving AC power from a power inverter during a motoring mode, the power inverter configured to invert DC power on a common DC bus to the driving AC power, the method comprising converting, by an AC-power source controller, AC power from the AC power source to DC power to be supplied to the common DC bus, wherein AC power supplied from the AC power source to the common DC bus is limited to a first AC-power-source power limit by the AC-power-source controller; and start supplying, by a DC-power-source controller, DC power from a DC power source to the common DC bus in response to a detection of a voltage drop on the common DC bus from an AC-power-source reference voltage to a DC-power-source reference voltage, the voltage drop resulting from power limiting by the AC-power-source-controller.

The modifications, additional features and effects described above with respect to the power management system are applicable to the method of controlling power supply in an elevator system in an analogous manner.

According to a further embodiment, the method further comprises, during a regenerative mode, supplying, the AC power-source controller, electric power from the common DC bus to the AC power source in response to a detection of a voltage rise on the DC common bus resulting from a power limiting action by another power controller included in the power management system like the DC-power-source controller, a DBR chopper, and a supercapacitor controller etc. The method may further comprises supplying, the DC-power-source controller (28), electric power from the common DC bus (38) to the DC power source (26) in response to a detection of a voltage rise on the DC common bus (38) resulting from a power limiting action by another power controller included in the power management system like the AC-power-source controller, a DBR chopper, and a supercapacitor controller etc.

According to a further embodiment, the method further comprises electrically connecting, by a DBR chopper, a dynamic braking resistor (DBR) and the common DC bus in response to a detection of a voltage rise on the common DC bus from the AC-power-source reference voltage to an upper DBR reference voltage; and particularly, electrically disconnecting, by the DBR chopper, the DBR from the common DC bus in response to a detection of a voltage drop from the upper DBR reference voltage to a lower DBR reference voltage.

DRAWING DESCRIPTION

Further exemplary embodiments of the invention are described in detail with reference to the enclosed figures.

DETAILED DESCRIPTION

Figure 1:
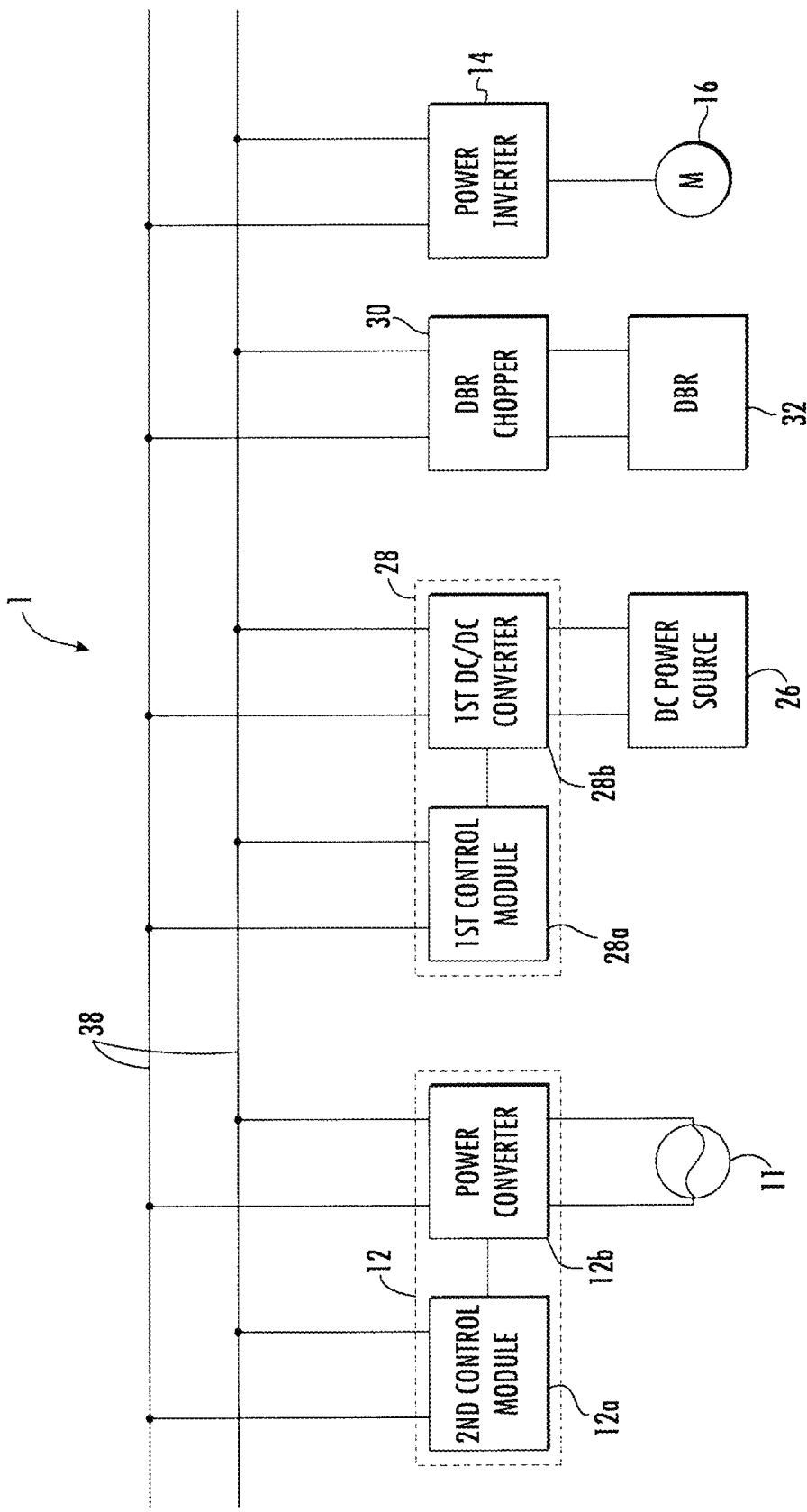
FIG. 1 is a block diagram of a power management system for an elevator system according to an exemplary embodiment of the invention.

FIG. 1 is a block diagram depicting of a power management system according to an exemplary embodiment of the invention.

The power management system 1 shown in FIG. 1 comprises an AC power source 11, an AC-power-source controller 12 comprising a second control module 12a and a power converter 12b, a DC power source 26, a DC-power-source controller 28 comprising a first control module 28a and a first DC/DC converter 28b, a DBR chopper 30, a dynamic braking resistor (DBR) 32, a power inverter 14, and a common DC bus 38. The power management system 1 is configured to supply AC power to an electric motor 16 via the power inverter 14 to drive an elevator car and a counterweight which are connected through a rope (not shown). The AC power may be a single-phase or three-phase AC power.

The power management system 1 is configured to drive the electric motor 16 mainly based on AC power supplied by the AC power source 11. The DC power source 26 can also be a power source providing the electric motor 16 with the driving power. The power converter 12b may be a bidirectional single-phase or three-phase power converter which is configured to convert the AC power supplied by the AC power source 11 to DC power and vice versa. The power inverter 14 may be a single-phase or three-phase power inverter that is configured to invert the DC power from the common DC bus 38 to single-phase or three-phase AC power to be delivered to the electric motor 16 to impart motion to the elevator car. In one example, this power conversion from DC power to single-phase or three-phase AC power may be done by operating switches connected in three bridge circuits in the power inverter 14, e.g. such as to apply a pulse width modulation (PWM) power conversion scheme. The power inverter 14 can operate in a bidirectional way, so that in the regenerative mode AC power regenerated by the electric motor 16 is converted by the power inverter 14 to DC power to be delivered to the common DC bus 38.

The power inverter 14 comprises a plurality of power switches to generate drive signals for the electric motor 16. The power switches may be insulated gate bipolar transistors (IGBTs) or metal-oxide-semiconductor field-effect transistors (MOSFETs) transistors, but other types of power switches may be used as well. Each power switch normally includes a flyback diode across its drain-source terminals. The flyback diode may be called a freewheeling diode or an antiparallel diode. The power switches are arranged in phase legs, each phase leg connected between the positive and negative poles of the common DC bus 38. An AC terminal is provided at a junction (e.g., source-drain junction) of the power switches in each phase leg. The AC terminal provides the output of the respective phase leg of the power inverter 14. The AC terminals are coupled to respective motor windings of the electric motor 16. In an exemplary embodiment, the electric motor 16 is a single-phase or three-phase, permanent magnet synchronous motor. The power inverter 14 may be a single-phase of three-phase inverter and the electric motor 16 may be a single-phase or three-phase motor, but embodiments are not limited to a particular number of phases. Gating pulses are produced by PWM signals to periodically switch the power switches in the power inverter 14 to supply single-phase or three-phase AC power to the electric motor 12. The speed and direction of movement of the elevator car may be varied by adjusting the frequency and magnitude of the gating pulses provided with the power switches.

The power converter 12b may be a single-phase or three-phase bidirectional power converter which is configured to convert the AC power supplied by the AC power source 11 to DC power. The power converter 12b may have a configuration corresponding to the configuration of the power inverter 14. Particularly, the power converter 12 may also comprise power switches arranged in phase legs, each phase leg connected between the positive and negative poles of the common DC bus 38. Different to the power inverter 14, positive and negative poles of the common DC bus 38 are coupled to the output of the phase legs of the power converter 12b. A terminal provided at a junction (e.g., source-drain junction) of the power switches in each phase leg provides the input of the respective phase leg of the power converter 12b. The power converter 12b may use power switches to convert DC power or AC power supplied to its input to a DC voltage supplied at its output. Power switches may also be IGBTs or MOSFETs, but other types of power switches may be used as well. Each power switch normally includes a flyback diode across its drain-source terminals. Thus, the power converter 12b is an actively controlled power converter 12b which is capable of regenerating power from the common DC bus 38 to the input side of the power converter 12b during a regenerative mode.

The second control module 12a of the AC-power-source controller 12 is configured to monitor energy flow on the common DC bus 38 ("DC-link side") to detect a change in voltage level on the common DC bus 38. The second control module 12a is also configured to monitor AC power exchanged between the AC power source 11 and the AC-power-source controller 12 ("grid side"). In particular, during a motoring mode, the second control module 12a is configured to limit the AC power supplied from the AC power source 11 to a first AC-power-source power limit. During a regenerative mode, the second control module 12a is further configured to limit regenerated power supplied from the common DC bus 38 to the AC power source 11 to a second AC-power-source power limit. The first and second AC-power-source power limits may be equal or may be set to different values. The power limitation can be achieved by the AC-power-source controller 12 by limiting an amount of current flowing from the AC power source 11 to the AC-power-source controller 12. When detecting a voltage drop or voltage rise on the common DC bus 38, the second control module 12a is configured to control the power converter 12b to convert AC power from the AC power source 11 to DC power to be delivered to the common DC bus 38 and vice versa. In order to perform this operation, the second control module 12a is configured to generate corresponding PWM signals to produce gating pulses to periodically switch the power switches in the power converter 12b.

The DC power source 26 is coupled to the common DC bus 38 via the DC-power-source controller 28 which comprises the first control module 28a and the first DC/DC converter 28b. The first control module 28a is configured to monitor the common DC bus 38 to detect a change in voltage level on the common DC bus 38. The first control module 28a is also configured to monitor DC power exchanged between the DC power source 26 and the DC-power-source controller 26 ("DC-power-source side"). In particular, during a motoring mode, the first control module 28a is configured to limit the DC power supplied from the DC power source 26 to a first DC-power-source power limit. During a regenerative mode, on the other hand, the first control module 28a is configured to limit regenerated power supplied from the common DC bus 38 to the DC power source 26 to a second DC-power-source power limit. The first and second DC-power-source power limits may be equal or may be set to different values. Upon detecting a voltage drop or a voltage rise on the common DC bus 38, the first control module 28a is configured to control the first DC/DC converter 28 to charge or discharge the DC power source 26. A voltage drop or a voltage rise on the common DC bus 38 results from a power limiting action by a power controller included in the power management system 1. The first DC/DC converter 28b may provide for conversion of different voltage levels between the DC power source 26 and the common DC bus 38. In this way, the DC power source 26 can supply DC power to the common DC bus 38 as necessary.

The DBR chopper 30 is configured to flow electric current on the common DC bus 38 through the DBR 32 to dissipate excess energy during the regenerative mode. A plurality of DBRs 32 may be connected serially or in parallel.

When the electric motor 16 operates in the regenerative mode, regenerated electric power may be delivered to at least one of the AC power source 11 or the DC power source 26. The DC power source 26 may comprise at least one secondary or rechargeable DC battery.

The operations of the power management system 1 according to the embodiment shown in FIG. 1 will be described in detail with reference to FIGS. 2A-3B.

Figure 2A:
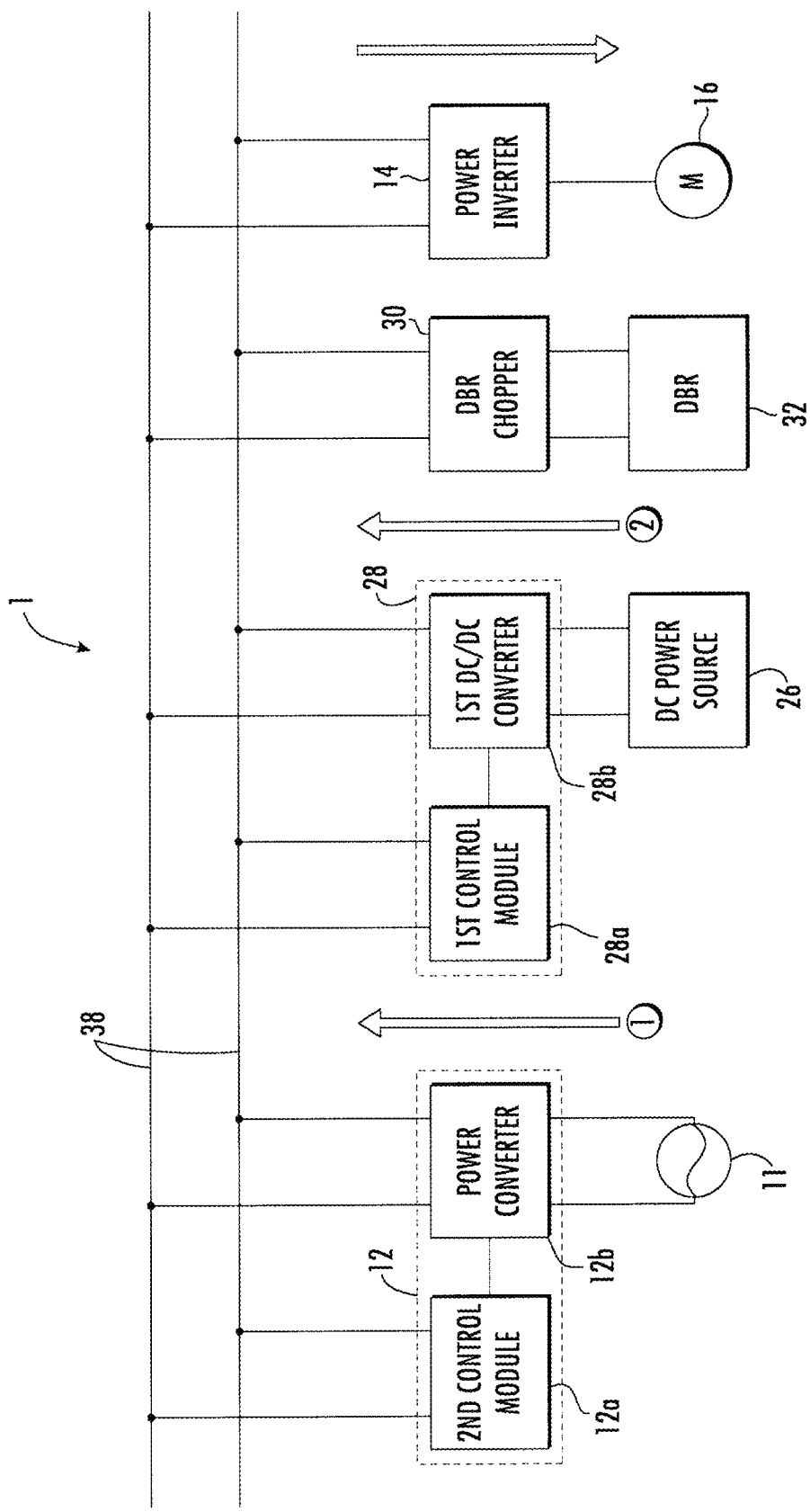
FIG. 2A and FIG. 2B are diagrams for describing operations of a power management system during a motoring mode according to an exemplary embodiment of the invention.
Figure 2B:
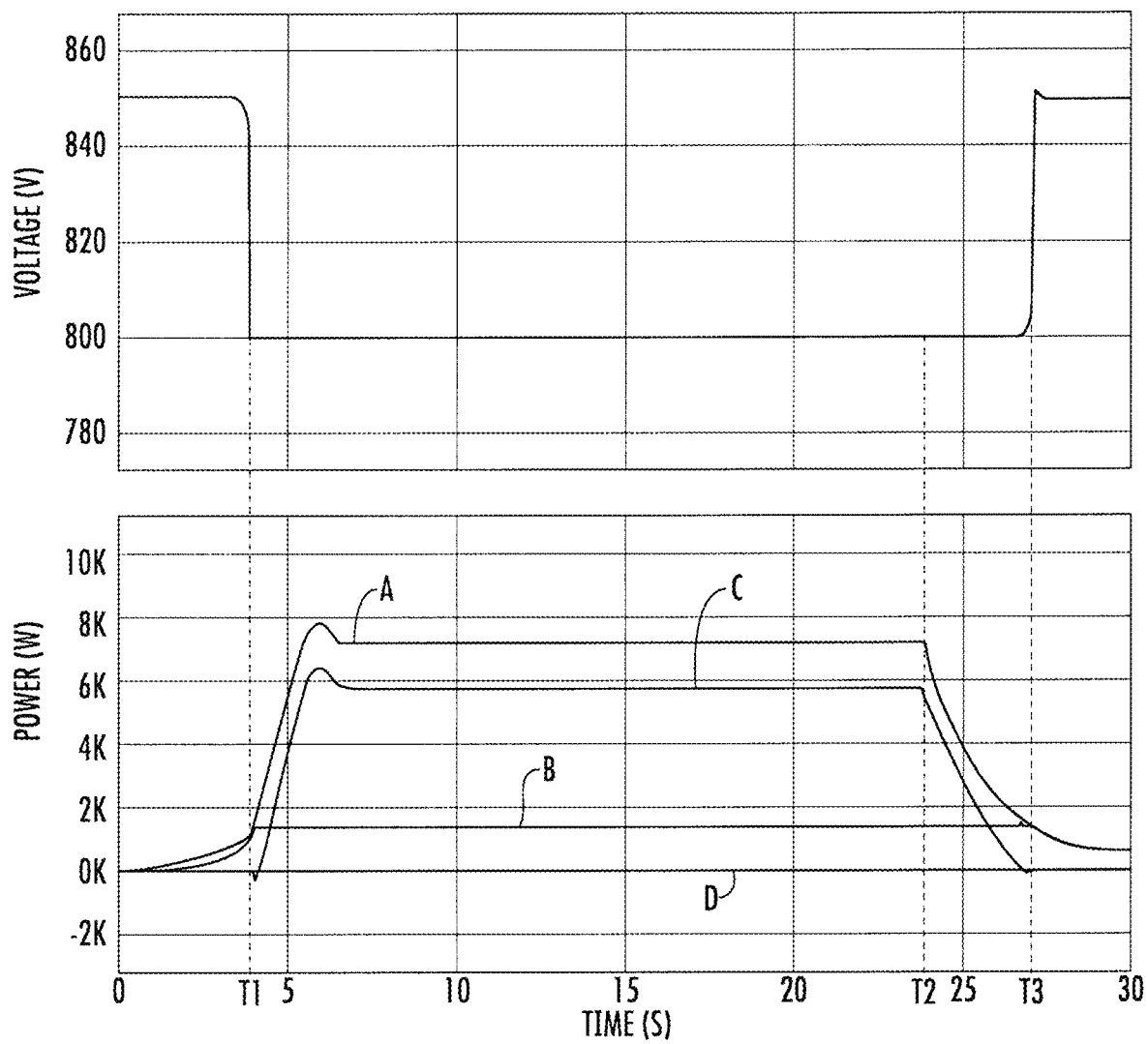

FIG. 2A and FIG. 2B are diagrams for describing the operations of the power management system 1 during a motoring mode according to an exemplary embodiment of the invention as shown in FIG. 1. In FIG. 2B, "Voltage" represents a voltage on the common DC bus 38, and "A," "B," "C," and "D" represent electric power consumed by the electric motor 16, electric power supplied by the AC power source 11, electric power supplied by the DC power source 26, and electric power consumed by the DBR 32, respectively. In FIG. 2A and FIG. 2B, it is assumed that a first AC-power-source power limit, an AC-power-source reference voltage, a first DC-power-source power limit, and a DC-power-source reference voltage have been predefined to be 1.8 kW, 850V, 6.5 kW, and 800V, respectively.

During the motoring mode, at least one of the AC power source 11 or the DC power source 26 is configured to supply AC power or DC power to the common DC bus 38 to be supplied to the electric motor 16 via the power inverter 14 to impart motion to an elevator car. In FIGS. 2A and 2B, when an elevator car is not moving (in FIG. 2B, t=0), the voltage level on the common DC bus 38 remains 850V which is the AC-power-source reference voltage set up for the AC-power-source controller 12. When the electric motor 16 starts consuming electric power, the AC power source 11 starts supplying AC power under the control of the AC-power-source controller 12. At this stage, the power supplied to the common DC bus 38 is controlled by the AC-power-source controller 12 only, until the power consumption by the electric motor 16 reaches 1.8 kW which is the first AC-power-source power limit predefined for the AC power source 11. In other words, the AC-power-source controller 12 regulates power supply on the common DC bus 38 and the voltage level on the common DC bus 38 remains at the AC-power-source reference voltage until electrical power supplied by the power converter 12b reaches the first AC-power-source power limit preset for the AC-power-source 11 (in FIG. 2B, 1.8 kW) during an initial stage the motoring mode. The limitation of power supply by the AC power source 11 can be achieved by limiting an amount of current flowing on the grid side by the second control module 12.

When power consumption by the electric motor 16 exceeds the first AC-power-source power limit, as shown in FIG. 2B at t=T1, the voltage level on the common DC bus 38 sharply drops because the power supplied by the AC power source 11 is limited to the first AC-power-source power limit. While monitoring the common DC bus 38, the first control module 28a of the DC-power-source controller 28 detects that the voltage level on the common DC bus 38 has dropped from the AC-power-source reference voltage to the DC-power-source reference voltage (in FIG. 2B, e.g. from 850V to 800V at t=T1) and thereafter the DC-power-source controller 28 starts supplying DC power from the DC power source 26 to the common DC bus 38 in addition to the 1.8 kW power delivered by the AC power source 11 via the AC power converter 12b. Hence, starting from t=T1 the DC-power-source controller 28 regulates flow of power on the common DC bus 38. In other words, the voltage drop on the common DC bus 38 triggers the DC-power-source controller 28 to activate the power supply by the DC power source 26. At this stage, electric power consumed by the electric motor 16 is supplied by both the AC power source 11 and the DC power source 26. Yet, the power supplied to the common DC bus 38 according to the power demand by the electric motor 16 is regulated by the DC-power-source controller 28. The DC-power-source reference voltage may be set to a value slightly above 800V, e.g. 805V, so that the voltage on the common DC bus 38 does not fall below 800V at any time.

As power consumption by the electric motor 16 starts decreasing at t=T2 in FIG. 2B, the voltage level on the common DC bus 38 will remain at 800V as long as the DC power source 26 delivers power to the common DC bus 38 when the power consumption of the elevator motor 16 drops below 1.8 kW at t=T3, power delivered by the DC power source 26 will become zero and the AC-power-source controller 12 will regulate the common DC bus 38 again. Hence, voltage will start to increase. Yet, the voltage on the common DC bus is kept at the DC-power-source reference voltage by the DC-power-source controller 28 by decreasing the DC power supplied by the DC power source 26 to the common DC bus 38. At t=T3 in FIG. 2B, the voltage level on the common DC bus sharply increases to 850V because the power converter 12b is still supplying electric power of 1.8 kW to the common DC bus 38, while the electric motor 16 is consuming less than 1.8 kW. At this point, the first DC/DC converter 28b stops providing DC power, and the power converter 12b will desaturate and start regulating the common DC bus 38 again. Voltage level on the common DC bus 38 remains at the AC-power-source reference voltage, i.e. 850 V. During the motoring mode, the DBR 32 remains inactive.

Figure 3A:
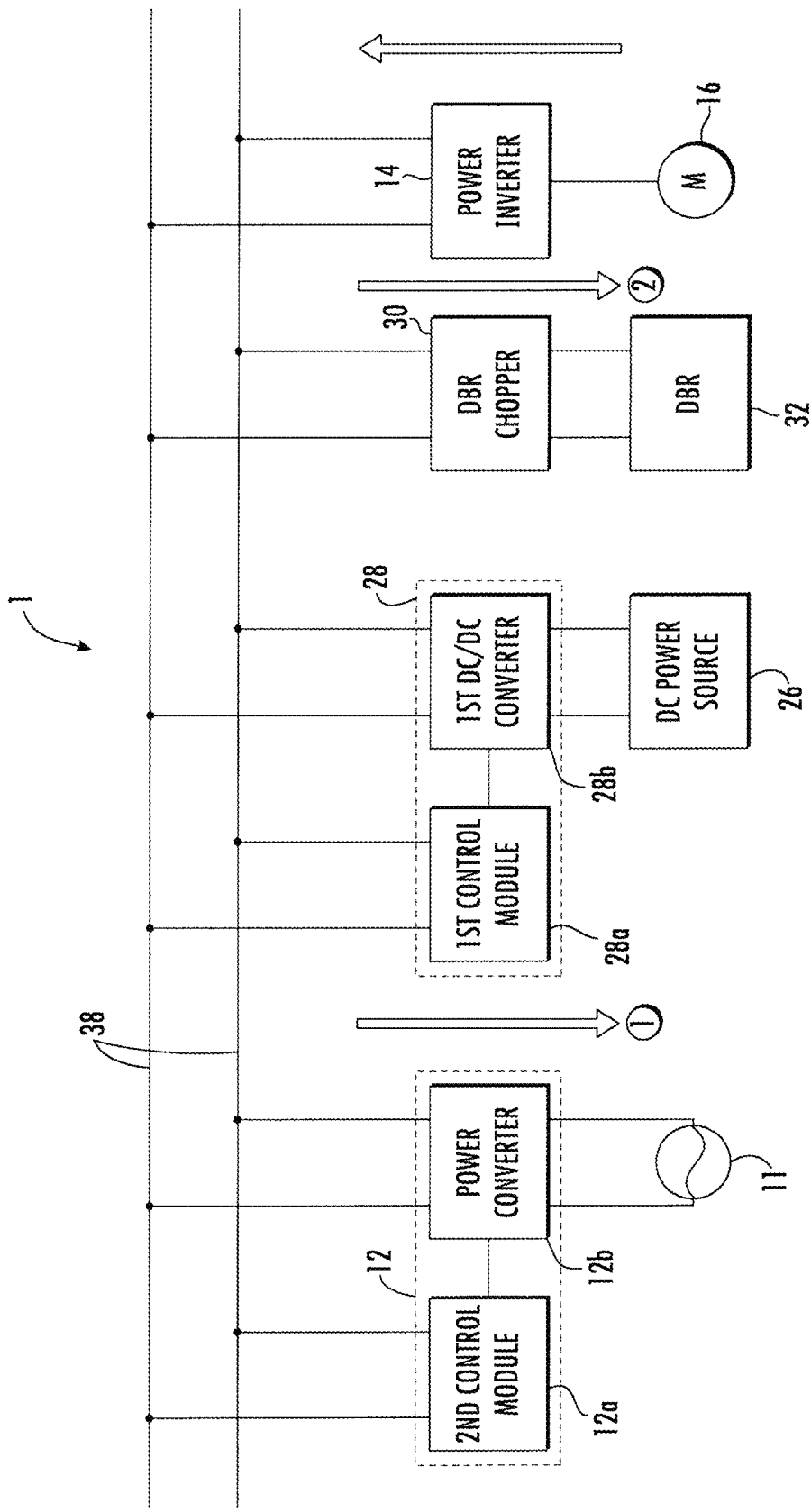
FIG. 3A and FIG. 3B are diagrams for describing operations of a power management system during a regenerative mode according to an exemplary embodiment of the invention.
Figure 3B:
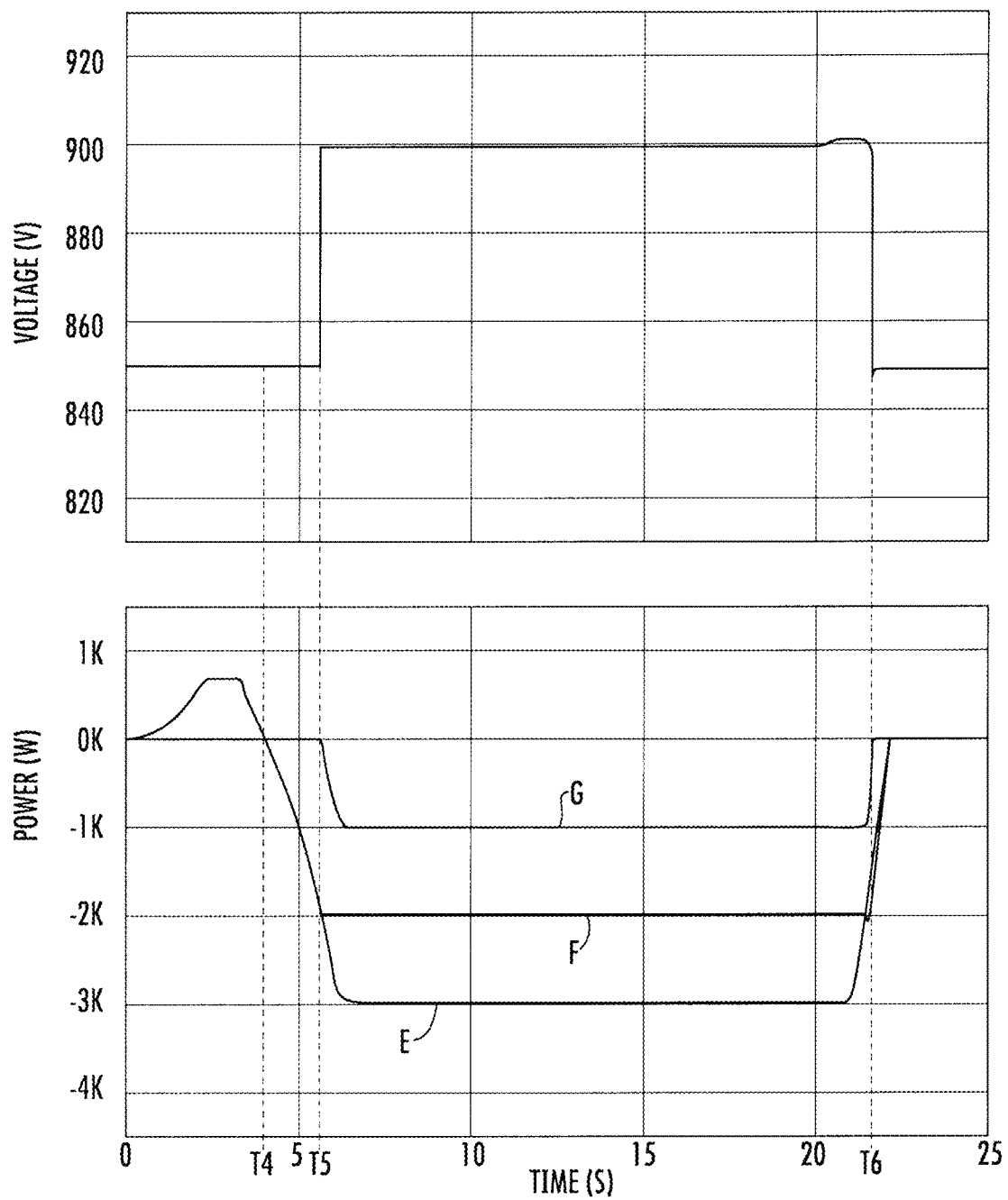

FIG. 3A and FIG. 3B are diagrams for describing the operations of the power management system 1 during the regenerative mode according to an exemplary embodiment of the invention. In FIG. 3B, "Voltage" represents a voltage on the common DC bus 38, and "E," "F," and "G" represent electric power generated by the electric motor 16, electric power regenerated to the AC power source 11, and electric power consumed by the DBR 32, respectively. In FIG. 3A and FIG. 3B, it is assumed that a second AC-power-source power limit, an upper DBR chopper reference voltage, a lower DBR chopper reference voltage have been predefined to be 2 kW, 900V, and 800V, respectively.

When the electric motor 16 operates in the regenerative mode, electric power regenerated by the electric motor 16 is to be delivered to the AC power source 11 or to the DBR 32 according to the embodiment of FIG. 3A. In some embodiments, regenerated electric power may be stored in the DC power source 26. At t=T4 in FIG. 3B, the electric motor 16 starts generating power to be supplied to the common DC bus 38 via the power inverter 14. Since the voltage on the common DC bus 38 is the AC-power-source reference voltage, i.e. 850V, at t=T4, the AC-power-source controller 12 regulates the common DC bus 38 and the power supplied by the electric motor 16 is regenerated to the AC power source 11 by the power converter 12b and the voltage on the common DC bus 38 is kept at the AC-power-source reference voltage. When power regenerated to the DC power source 11 exceeds the second AC-power-source power limit (e.g. 2 kW at t=T5 in FIG. 3B) of the power converter 12b, the voltage on the common DC bus 38 sharply increases until it reaches the upper DBR chopper reference voltage at t=T5 in FIG. 3B. When the DBR chopper 30 detects a voltage rise on the common DC bus 38 from the AC-power-source reference voltage, i.e. 850V to the upper DBR chopper reference voltage, i.e. 900V, the DBR chopper 30 starts regulating the common DC bus 38 and electrically connects the DBR 32 and the common DC bus 38 to dissipate excess energy on the common DC bus 38. The voltage level on the common DC bus 38 is kept at the upper DBR chopper reference voltage by the DBR chopper 30. When the electric motor 16 stops generating power and the amount of power generated by the electric motor 16 becomes equal to the power limit of the power converter 12 at t=T6, the voltage on the common DC bus 38 sharply drops to the first threshold value and the second controller 12 starts regulating the common DC bus 38 again.

Figure 4:
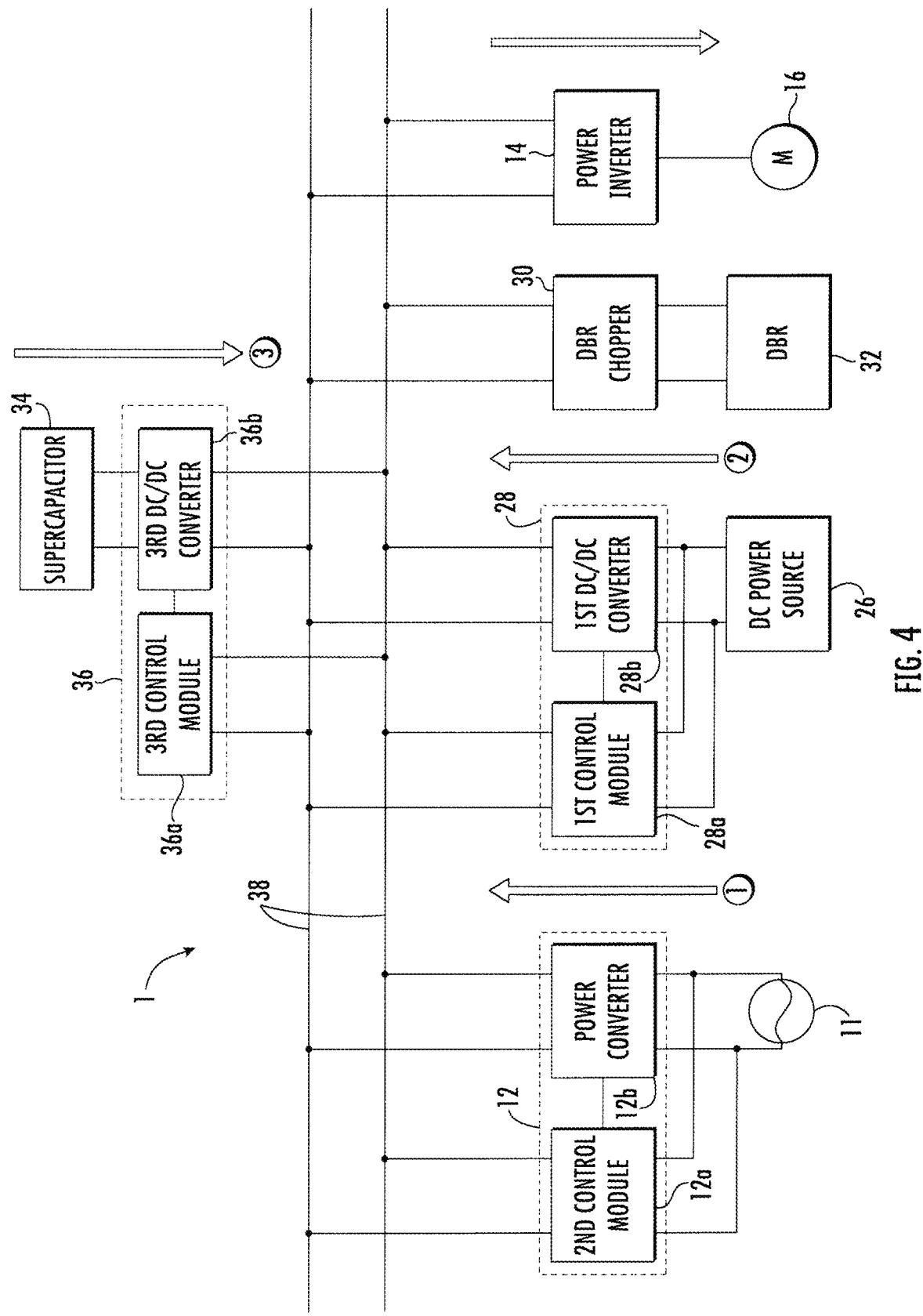
FIG. 4 is a block diagram depicting a power management system operating in a motoring mode according to another exemplary embodiment of the invention.

FIG. 4 is a block diagram depicting a power management system operating in a motoring mode according to another exemplary embodiment of the invention. Compared to the embodiment of FIG. 2A, a supercapacitor 34 is further coupled to the common DC bus 38 through a supercapacitor controller 36 comprising a third control module 36a and a third DC/DC converter 36b.

As indicated in FIG. 4, electric power may be sequentially supplied by the AC power source 11, the DC power source 26, and the supercapacitor 34. A first AC-power-source power limit, an AC-power-source reference voltage, a first DC-power-source power limit, a DC-power-source reference voltage, a first supercapacitor power limit, and a supercapacitor reference voltage have been predefined to be 2 kW, 850V, 6.5 kW, 800V, 1.5 kW, and 750V, respectively, for example.

The same principles with the embodiment of FIG. 2A can be applied to operations of the power management system 1 of FIG. 4. In particular, during the motoring mode, when the electric motor 16 starts consuming electric power, the AC-power-source controller 12 starts supplying AC power from the AC power source 11 to the common DC bus until power consumption by the electric motor 16 reaches the first AC-power-source power limit, i.e. 2 kW. Since power supply by the AC power source 11 is limited to the first AC-power-source power limit, when the power consumption by the electric motor 16 exceeds 2 kW, the voltage level on the common DC bus 38 sharply drops. In response to a detection of the voltage drop from the AC-power-source reference voltage to the DC-power-source reference voltage, the DC-power-source controller 28 starts supplying DC power from the DC power source 28 to the common DC bus 38. Until the power consumption by the electric motor 16 reaches 8.5 kW which is a sum of the first AC-power-source power limit and the first DC-power-source power limit, voltage level on the common DC bus 38 is kept at the DC-power-source reference voltage, i.e. 800V by the DC-power-source controller 28. The DC-power-source controller 28 is configured to limit power supply by the DC power source 26 to the first DC-power-source power limit. When the power consumption by the electric motor 16 exceeds 8.5 kW, voltage level on the common DC bus 38 sharply drops again from the DC-power-source reference voltage to the supercapacitor reference voltage. Upon detection of the voltage drop, the supercapacitor controller 36 starts supplying power from the supercapacitor 34 to the common DC bus 38.

Figure 5:
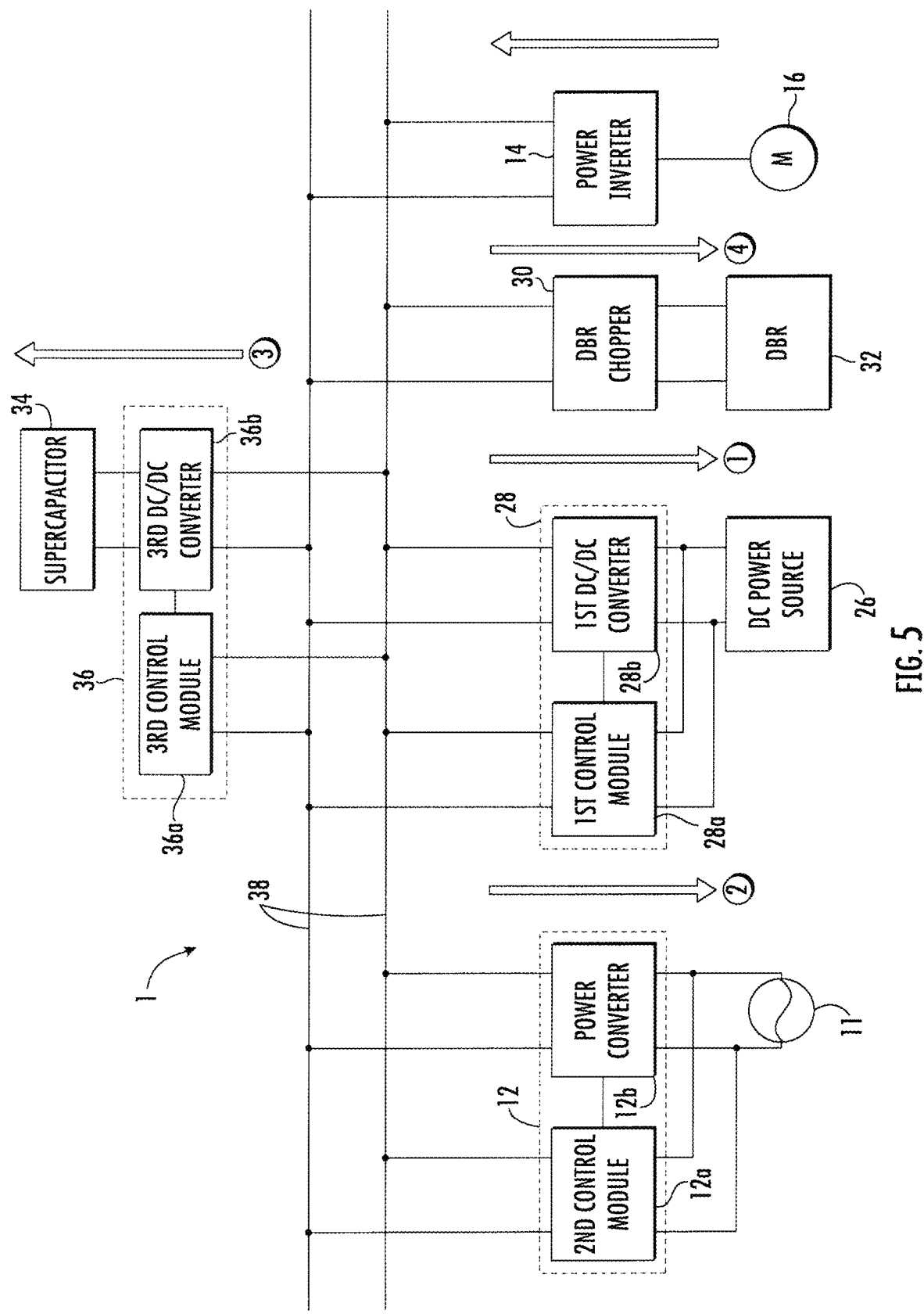
FIG. 5 is a block diagram depicting a power management system operating in a regenerative mode according to another exemplary embodiment of the invention.

FIG. 5 is a block diagram depicting a power management system operating in a regenerative mode according to another exemplary embodiment of the invention. Compared to the embodiment of FIG. 3A, a supercapacitor 34 is further coupled to the common DC bus 38 through a supercapacitor controller 36 comprising a third control module 36a and a third DC/DC converter 36b.

As shown in FIG. 5, regenerated power by the electric motor 16 may be sequentially delivered to the DC power source 26, the AC power source 11, and the supercapacitor 34, and then excess energy will be dissipated by the DBR 32. A second AC-power-source power limit, an AC-power-source reference voltage, a second DC-power-source power limit, a DC-power-source reference voltage, a second supercapacitor power limit, a supercapacitor reference voltage, and an upper DBR reference voltage have been predefined to be 2 kW, 850V, 1 kW, 800V, 1.5 kW, 870V, and 900V, respectively, for example.

In the regenerative mode, when the electric motor 16 starts generating electric power, the DC-power-source controller 28 starts delivering DC power from the common DC bus 38 to the DC power source 26 until the DC power delivered to the DC power source 26 reaches the second DC-power-source power limit, i.e. 1 kW. At this stage, the voltage level on the common DC bus 38 is kept at the DC-power-source reference voltage, i.e. 800V. When the power delivered to the DC power source 26 exceeds the second DC-power-source power limit, the voltage level on the common DC bus 38 sharply increases. Upon detection of the voltage rise from the DC-power-source reference voltage to the AC-power-source reference voltage, the AC-power-source controller 12 starts delivering electric power from the common DC bus 38 to the AC power source 11. Until the power delivered to the AC power source 11 reaches the second AC-power-source power limit, voltage level on the common DC bus 38 remains at the AC-power-source reference voltage, i.e. 850V by the AC-power-source controller 12. The AC-power-source controller 12 is configured to limit power delivered to the AC power source 11 to the second AC-power-source power limit. When the power delivered to the AC power source 11 exceeds the second AC-power-source power limit, voltage level on the common DC bus 38 sharply rises again from the AC-power-source reference voltage to the supercapacitor reference voltage. Upon detection of the voltage rise on the common DC bus 38, the supercapacitor controller 36 starts charging power from the common DC bus 38 to the supercapacitor 34. Power charging to the supercapacitor 34 continues until the power delivered to the supercapacitor 34 reaches the second supercapacitor power limit. When the power delivered to the supercapacitor 34 exceeds the second supercapacitor power limit, the common DC bus 38 experiences a voltage rise again. In response to a detection of the voltage rise on the common DC bus 38 from the supercapacitor reference voltage to the upper DBR reference voltage, the DBR chopper 30 electrically connects the DBR 32 and the common DC bus 38 to dissipate excess energy on the common DC bus 38.

According to the embodiments of the present invention, decentralization can be achieved in controlling power supply by each of power controllers like a power converter, a DC/DC converter, and a DBR chopper in a power management system for an elevator system. In addition, a central controller and fast or normal communications are unnecessary in a power management system. Lifetime of a DC battery used in the power management system can be maximized since the discharging voltage and analogously the discharging current can be limited to a certain limit recommended by manufacturers.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 1 power management system
11 AC power source
12 second controller
12a second control module
12b power converter
14 power inverter
16 electric motor
26 DC power source
28 first controller
28a first control module
28b 1st DC/DC converter
30 DBR chopper
32 dynamic braking resistor
34 supercapacitor
36 supercapacitor controller
36a 3rd control module
36b 3rd DC/DC converter
38 common DC bus

What is claimed is:

1. A power management system (1) configured to exchange power between an AC power source (11) and an electric motor (16) of an elevator system, the power management system (1) comprising:
   an AC-power-source controller (12) configured to control power supply between the AC power source (11) and a common DC bus (38), the AC-power-source controller (12) further configured to limit AC power supplied from the AC power source (11) to the common DC bus (38) to a first AC-power-source power limit;
   a power inverter (14) configured to invert the DC power on the common DC bus (38) into AC power for driving the electric motor (16);
   a DC power source (26) configured to supply DC power to the common DC bus (38); and
   a DC-power-source controller (28) configured to control power supply between the DC power source (26) and the common DC bus (38), the DC-power-source controller (28) configured to start supplying DC power from the DC power source (26) to the common DC bus (38) in response to a detection of a voltage drop on the common DC bus (38) from a AC-power-source reference voltage to a DC-power-source reference voltage, the voltage drop resulting from power limiting by the AC-power-source-controller (12);
   wherein, during a regenerative mode, the AC-power-source controller (12) is configured to limit AC power supplied from the DC common bus (38) to the AC power source (11) to a second AC-power-source power limit,
   wherein the DC-power-source controller (28) is configured to limit power supplied from the common DC bus (38) to the DC power source (26) to a second DC-power-source power limit;
   wherein, during the regenerative mode, the AC power-source controller (12) is configured to supply electric power from the common DC bus (38) to the AC power source (11) in response to a detection of a voltage rise on the DC common bus (38) resulting from a power limiting action by another power controller,
   wherein the DC-power-source controller (28) is configured to supply electric power from the common DC bus (38) to the DC power source (26) in response to a detection of a voltage rise on the DC common bus (38) resulting from a power limiting action by another power controller.

2. The power management system according to claim 1, wherein, until the power supplied from the AC power source (11) to the common DC bus (38) reaches the first AC-power-source power limit, the AC-power-source controller (12) is configured to keep a voltage level on the common DC bus (38) at the AC-power-source reference voltage.

3. The power management system according to claim 1, wherein the DC-power-source controller (28) is further configured to limit power supplied from the DC power source (26) to the common DC bus (38) to a first DC-power-source power limit.

4. The power management system according to claim 3, further comprising:
   a third power source configured to supply electric power to the common DC bus (38); and
   a third-power-source controller configured to control power supply between the third power source and the common DC bus (38).

5. The power management system according to claim 4, wherein the third-power-source controller is further configured to start supplying electric power from the third power source to the common DC bus (38) in response to a detection of a voltage drop on the common DC bus (38) from the DC-power-source reference voltage to a third-power-source reference voltage.

6. The power management system according to claim 5, wherein, until the power supplied from the DC power source (26) to the common DC bus (38) reaches the first DC-power-source power limit, the DC-power-source controller (28) is further configured to keep a voltage level on the common DC bus (38) at the DC-power source reference voltage.

7. The power management system according to claim 4, wherein the third power source is a supercapacitor or an alternative power source.

8. The power management system according to claim 1, further comprising:
   a dynamic braking resistor (32) (DBR) coupled to the common DC bus (38); and
   a DBR chopper (30) configured to monitor the common DC bus (38) and to electrically connect or disconnect the DBR (32) and the common DC bus (38) depending on a detected voltage level on the common DC bus (38).

9. The power management system according to claim 8, wherein, during a regenerative mode, the DBR chopper (30) is configured to electrically connect the DBR (32) and the common DC bus (38) in case the voltage level on the common DC bus (38) reaches an upper DBR reference voltage,
   wherein the DBR chopper (30) is further configured to electrically disconnect the DBR (32) from the common DC bus (38) in case the voltage level on the common DC bus (38) has dropped from the upper DBR reference voltage to a lower DBR reference voltage.

10. An elevator system equipped with a power management system (1) according to claim 1.

11. A method of controlling power supply in an elevator system having an electric motor which is provided with driving AC power from a power inverter (14) during a motoring mode, the power inverter (14) configured to invert DC power on a common DC bus (38) to the driving AC power, the method comprising:
- converting, by an AC-power-source controller (12), AC power from the AC power source (11) to DC power to be supplied to the common DC bus (38), wherein AC power supplied from the AC power source (11) to the common DC bus (38) is limited to a first AC-power-source power limit by the AC-power-source controller (12); and
- start supplying, by a DC-power-source controller (28), DC power from a DC power source (26) to the common DC bus (38) in response to a detection of a voltage drop on the common DC bus (38) from an AC-power-source reference voltage to a DC-power-source reference voltage, the voltage drop resulting from power limiting by the AC-power-source-controller (12);
- during a regenerative mode, supplying, the AC power-source controller (12), electric power from the common DC bus (38) to the AC power source (11) in response to a detection of a voltage rise on the DC common bus (38) resulting from a power limiting action by another power controller; and
- supplying, the DC-power-source controller (28), electric power from the common DC bus (38) to the DC power source (26) in response to a detection of a voltage rise on the DC common bus (38) resulting from a power limiting action by another power controller.

12. A method of controlling power supply in an elevator system having an electric motor which is provided with driving AC power from a power inverter (14) during a motoring mode, the power inverter (14) configured to invert DC power on a common DC bus (38) to the driving AC power, the method comprising:
- converting, by an AC-power-source controller (12), AC power from the AC power source (11) to DC power to be supplied to the common DC bus (38), wherein AC power supplied from the AC power source (11) to the common DC bus (38) is limited to a first AC-power-source power limit by the AC-power-source controller (12); and
- start supplying, by a DC-power-source controller (28), DC power from a DC power source (26) to the common DC bus (38) in response to a detection of a voltage drop on the common DC bus (38) from an AC-power-source reference voltage to a DC-power-source reference voltage, the voltage drop resulting from power limiting by the AC-power-source-controller (12);
- electrically connecting, by a DBR chopper (30), a dynamic braking resistor (DBR) (32) and the common DC bus (38) in response to a detection of a voltage rise on the common DC bus (38) from the AC-power-source reference voltage to an upper DBR reference voltage; and
- electrically disconnecting, by the DBR chopper (30), the DBR (32) from the common DC bus (38) in response to a detection of a voltage drop from the upper DBR reference voltage to a lower DBR reference voltage resulting from a power limiting action by another power controller.

13. A power management system (1) configured to exchange power between an AC power source (11) and an electric motor (16) of an elevator system, the power management system (1) comprising:
- an AC-power-source controller (12) configured to control power supply between the AC power source (11) and a common DC bus (38), the AC-power-source controller (12) further configured to limit AC power supplied from the AC power source (11) to the common DC bus (38) to a first AC-power-source power limit;
- a power inverter (14) configured to invert the DC power on the common DC bus (38) into AC power for driving the electric motor (16);
- a DC power source (26) configured to supply DC power to the common DC bus (38); and
- a DC-power-source controller (28) configured to control power supply between the DC power source (26) and the common DC bus (38), the DC-power-source controller (28) configured to start supplying DC power from the DC power source (26) to the common DC bus (38) in response to a detection of a voltage drop on the common DC bus (38) from a AC-power-source reference voltage to a DC-power-source reference voltage, the voltage drop resulting from power limiting by the AC-power-source-controller (12);
- wherein, until the power supplied from the AC power source (11) to the common DC bus (38) reaches the first AC-power-source power limit, the AC-power-source controller (12) is configured to keep a voltage level on the common DC bus (38) at the AC-power-source reference voltage;
- wherein the DC-power-source controller (28) is further configured to limit power supplied from the DC power source (26) to the common DC bus (38) to a first DC-power-source power limit;
- further comprising:
- a third power source configured to supply electric power to the common DC bus (38); and
- a third-power-source controller configured to control power supply between the third power source and the common DC bus (38);
- wherein the third-power-source controller is further configured to start supplying electric power from the third power source to the common DC bus (38) in response to a detection of a voltage drop on the common DC bus (38) from the DC-power-source reference voltage to a third-power-source reference voltage;
- wherein, until the power supplied from the DC power source (26) to the common DC bus (38) reaches the first DC-power-source power limit, the DC-power-source controller (28) is further configured to keep a voltage level on the common DC bus (38) at the DC-power source reference voltage;
- wherein, during a regenerative mode, the AC-power-source controller (12) is further configured to limit AC power supplied from the DC common bus (38) to the AC power source (11) to a second AC-power-source power limit;
- wherein the DC-power-source controller (28) is further configured to limit power supplied from the common DC bus (38) to the DC power source (26) to a second DC-power- source power limit;
- wherein, during the regenerative mode, the AC power-source controller (12) is configured to supply electric power from the common DC bus (38) to the AC power source (11) in response to a detection of a voltage rise on the DC common bus (38) resulting from a power limiting action by another power controller;

wherein the DC-power-source controller (28) is configured to supply electric power from the common DC bus (38) to the DC power source (26) in response to a detection of a voltage rise on the DC common bus (38) resulting from a power limiting action by another power controller;

further comprising:

a dynamic braking resistor (32) (DBR) coupled to the common DC bus (38); and a DBR chopper (30) configured to monitor the common DC bus (38) and to electrically connect or disconnect the DBR (32) and the common DC bus (38) depending on a detected voltage level on the common DC bus (38);

wherein, during a regenerative mode, the DBR chopper (30) is configured to electrically connect the DBR (32) and the common DC bus (38) in case the voltage level on the common DC bus (38) reaches an upper DBR reference voltage;

wherein the DBR chopper (30) is further configured to electrically disconnect the DBR (32) from the common DC bus (38) in case the voltage level on the common DC bus (38) has dropped from the upper DBR reference voltage to a lower DBR reference voltage.

* * * * *